US009312891B2

(12) United States Patent
Rafique (10) Patent No.: US 9,312,891 B2
(45) Date of Patent: Apr. 12, 2016

(54) MATRIX FOR USE WITH A RADIO TRANSCEIVER AND METHODS THERETO

(71) Applicant: ST-Ericsson SA, Plan-les-Ouates (CH)

(72) Inventor: Raihan Rafique, Lund (SE)

(73) Assignee: ST-ERICSSON SA, Plan-les-Ouates (CH)

( * ) Notice: Subject to any disclaimer, the term of this patent is extended or adjusted under 35 U.S.C. 154(b) by 53 days.

(21) Appl. No.: 14/273,654

(22) Filed: May 9, 2014

(65) Prior Publication Data

US 2014/0355459 A1  Dec. 4, 2014

(30) Foreign Application Priority Data

May 23, 2013 (EP) ..................... 13168824

(51) Int. Cl.
*H04B 1/04* (2006.01)
*H04B 15/06* (2006.01)
*H04W 24/06* (2009.01)
*H04W 88/02* (2009.01)

(52) U.S. Cl.
CPC .............. *H04B 1/0475* (2013.01); *H04B 15/06* (2013.01); *H04W 24/06* (2013.01); *H04W 88/02* (2013.01)

(58) Field of Classification Search
None
See application file for complete search history.

(56) References Cited

U.S. PATENT DOCUMENTS

| 8,121,573 | B2 | 2/2012 | Haralabidis et al. | |
| 8,145,165 | B1* | 3/2012 | Su ...................... | H03G 3/3052 455/232.1 |
| 2004/0218562 | A1 | 11/2004 | Orava et al. | |
| 2007/0153878 | A1* | 7/2007 | Filipovic .............. | H04B 1/1036 375/147 |
| 2011/0098014 | A1 | 4/2011 | Martens et al. | |
| 2011/0103431 | A1 | 5/2011 | Narasimha et al. | |
| 2011/0312287 | A1* | 12/2011 | Ramachandran et al. ...... | 455/77 |
| 2012/0154010 | A1* | 6/2012 | Singhal et al. ............... | 327/299 |
| 2013/0208826 | A1* | 8/2013 | Asuri ..................... | H04L 25/08 375/296 |
| 2014/0194076 | A1* | 7/2014 | Hwang et al. .................. | 455/77 |

OTHER PUBLICATIONS

Extended European Search Report issued in corresponding European application dated Nov. 5, 2013.
Lustgarten, M. N., "A Method for Computing Intermodulation-Free Frequency Lists," Electromagnetic Compatibility Symposium Record, 1968 IEEE, Jul. 1968, pp. 75-82, XP032170126, DOI: 10.1109/TEMC.1968.4307121.
B. Izouggaghen, et al.; Spurs modeling in direct digital period synthesizers related to phase accumulator truncation; ISCAS '04 Proceedings of the 204 International Symposium on Circuits and Systems; vol. 3; pp. 389-392; May 26, 2004.
Assaad Borjak, et al.; Intermodulation Products for a Mixer Subjected to a Multi-Carrier Signal; Microwave Journal; pp. 1-6; Feb. 1, 2002.

(Continued)

*Primary Examiner* — Yemane Mesfin
*Assistant Examiner* — Peter Chen
(74) *Attorney, Agent, or Firm* — Patent Portfolio Builders PLLC (57) ABSTRACT

A matrix for use with a radio transceiver having at least two signal sources is provided. The matrix comprises for each selected set of two or more signal sources, a list of combinations of harmonics of the signal sources, the combinations of harmonics each having a predicted amplitude greater than a predetermined threshold, and a frequency within a defined range related to a frequency range of one of the signal sources. Further, methods for generating such matrix and methods for avoiding spurs are provided.

5 Claims, 12 Drawing Sheets

(56) References Cited

OTHER PUBLICATIONS

Ryan Groulx, et al.; "Minimization of DDS Spurious Content in Multi-Channel Systems"; High Frequency Electronics; pp. 18-28; Oct. 2006.

T. Kos; "An algorithm for counting of intermodulation products in multicarrier broadband systems"; Proceedings of the IEEE International Symposium on Industrial Electronics, ISIE '99, vol. 1; pp. 95-98; Jul. 12, 1999.

Rhode & Schwarz; "Spurious Emission Measurement on 3GPP Base Station Transmitters"; pp. 1-24; Jan. 2002.

* cited by examiner

Fig. 9 i(f) = harmonics index     i(f) = -L(f):L(f)
f = Frequency index     f = 1:N

Step 01a   Create array for harmonic index for one of the frequency (-L(1):L(1))

| -L(1) | -L(1)+1 | -L(1)+2 | ... | 0 | ... | L(1)-2 | L(1)-1 | L(1) |
|---|---|---|---|---|---|---|---|---|

Step 01b   with Step 01a Fill array of same length for other frequency with minimum harmonic index (-L(f))

| -L(1) | -L(1)+1 | -L(1)+2 | ... | 0 | ... | L(1)-2 | L(1)-1 | L(1) |
|---|---|---|---|---|---|---|---|---|
| -L(2) | -L(2) | -L(2) | ... |  |  | -L(2) | -L(2) | -L(2) |
| -L(3) | -L(3) | -L(3) | ... |  |  | -L(3) | -L(3) | -L(3) |
| ... | ... | ... | ... |  |  | ... | ... | ... |
| -L(N) | -L(N) | -L(N) | ... |  |  | -L(N) | -L(N) | -L(N) | or

| -L(1):L(1) |
|---|
| -L(2) |
| -L(3) |
| ... |
| -L(N) |

Step 02   Copy matrix of Step 01 and fill up second row for different harmonic index for frequency two (-L(2):L(2))

| -L(1):L(1) | -L(1):L(1) | -L(1):L(1) | ... | -L(1):L(1) | -L(1):L(1) | -L(1):L(1) |
|---|---|---|---|---|---|---|
| -L(2) | -L(2)+1 | -L(2)-2 |  | L(2)-2 | L(2)-1 | L(2) |
| -L(3) | -L(3) | -L(3) | ... | -L(3) | -L(3) | -L(3) |
| ... | ... | ... | ... | ... | ... | ... |
| -L(N) | -L(N) | -L(N) | ... | -L(N) | -L(N) | -L(N) | or

| -L(1):L(1) |
|---|
| -L(2):L(2) |
| -L(3) |
| ... |
| -L(N) |

Step 03   Copy matrix of Step 02 and cascade to fill up third row for different harmonic index for frequency three (-L(3):L(3))

| -L(1):L(1) | -L(1):L(1) | -L(1):L(1) | ... | -L(1):L(1) | -L(1):L(1) | -L(1):L(1) |
|---|---|---|---|---|---|---|
| -L(2):L(2) | -L(2):L(2) | -L(2):L(2) |  | -L(2):L(2) | -L(2):L(2) | -L(2):L(2) |
| -L(3) | -L(3)+1 | -L(3)+2 | ... | L(3)-2 | L(3)-1 | L(3) |
| ... | ... | ... | ... | ... | ... | ... |
| -L(N) | -L(N) | -L(N) | ... | -L(N) | -L(N) | -L(N) | or

| -L(1):L(1) |
|---|
| -L(2):L(2) |
| -L(3):L(3) |
| ... |
| -L(N) |

Step (f)   In similar way copy matrix of previous step and cascade to fill up respective row for different harmonic index for frequency three (-L(f):L(f))

| -L(1):L(1) | -L(1):L(1) | -L(1):L(1) | ... | -L(1):L(1) | -L(1):L(1) | -L(1):L(1) |
|---|---|---|---|---|---|---|
| -L(2):L(2) | -L(2):L(2) | -L(2):L(2) | ... | -L(2):L(2) | -L(2):L(2) | -L(2):L(2) |
| -L(3):L(3) | -L(3):L(3) | -L(3):L(3) | ... | -L(3):L(3) | -L(3):L(3) | -L(3):L(3) |
| ... | ... | ... | ... | ... | ... | ... |
| -L(N) | -L(N)+1 | -L(N)+2 | ... | L(N)-2 | L(N)-1 | L(N) | or

| -L(1):L(1) |
|---|
| -L(2):L(2) |
| -L(3):L(3) |
| ... |
| -L(N):L(N) |

MATRIX FOR USE WITH A RADIO TRANSCEIVER AND METHODS THERETO

RELATED APPLICATIONS

This claims priority and benefit from European Application No. 13168824.4, filed May 23, 2013, the entire teachings of which are incorporated herein by reference.

TECHNICAL FIELD

Embodiments herein relate to methods for identifying and predicting spur frequencies in radio transceivers.

BACKGROUND

Spurious emission of Tx is troublesome for any RF-ASIC design. The RF-ASIC for the multi-band multi-standard, e.g. mobile phones, contains more than one Tx and Rx with multiple VCO, which makes the situation for spurious emission very complex. The problem is severe for mobile phones with multi-band multi-standard radio AISC. In such RF-ASICs the occurrence of spurious emission in the band of interest is very common and thus causes problems.

As the fabrication technology for Integrated circuits (IC) shows lower and lower production costs, the total cost of Application Specific Integrated Circuits (ASIC) nowadays mostly depends on design, verification and characterization time rather than production cost itself. Radio Frequency (RF) ASIC is one of the densely integrated systems-on-chip (SoC), containing transmitter (Tx), receivers (Rx) and corresponding local oscillators (LO) and voltage controlled oscillators (VCO), clocks and digital blocks.

In attempts to solve the problems related to the spurious emission a first step have been to identify or predict the spur frequencies. For a simple mixer, the spur frequencies can be predicted very easily from local oscillator (LO) and baseband (BB) signal. However, for multi-standard radio, much more calculations or careful measurements are needed in order to identify and eliminate spurs. Several methods and articles are available to describe spur elimination method for BB signals. Some articles also addresses spur issues for multi-band signals such as pattern generator or satellite TV where the carriers are in periodic distance with single LO. The spur search time for a multi-standard radio will be a multiplication of the total combination number of operational modes and the measurement time for a single mode. During the carrier aggregation for Long Term Evaluation (LTE) mode, the number of combinations increases more. For a single operational mode in single band of a TRx of a RF-ASIC the spur search time depends on bandwidth (BW), noise-level, Resolution Bandwidth (RBW).

US 2011/0103431 discloses interference cancellation in a multi-standard receiver. All possible spur frequencies are measured separately. The method includes receiving a signal of a second radio technology with interference from a transmission signal of a first radio technology, translating the interference into a narrower frequency band to obtain a received signal with narrowband interference, and filtering the received signal with narrowband interference to obtain a signal without the interference.

U.S. Pat. No. 8,121,573 discloses a multi-standard communication system including the aspect of determining spurs. It discloses methods and systems for coexistence in a multi-band, multi-standard communication system utilizing a plurality of phase locked loops (PLLs). Aspects include determining one or more desired frequencies of operation of a transceiver, determining a frequency of unwanted signals such as spurs, intermodulation, and/or mixing product signals, and configuring the PLLs to operate at a multiple of the desired frequencies while avoiding the unwanted signals. The desired frequencies may be generated utilizing integer, which may include multi-modulus dividers. The wireless communication standards may include LTE, GSM, EDGE, GPS, Bluetooth, WiFi, and/or WCDMA, for example. The frequencies may be configured to mitigate interference. PLLs may be shared when operating in TDD mode, and used separately operating in FDD mode. One or more digital interface signals, zero exceptions on a transmitter spur emission mask, and sampling clocks for ADCs and/or DACs in the transceiver may be generated utilizing the PLLs. In an exemplary embodiment, there may be three different filter types and eight different filter cutoff frequencies in the filter. Further, the use of Tx spur masks is mentioned.

A problem is that very little information is available for the multi-band TRx for multi-standard radio where the carriers are not periodic, the signal strengths are not equal and there is presence of multiple clocks and LOs. The process of spur search is a very tedious work which leads to longer design cycle of TRx with low test coverage. A known spur search method for equally spaced carrier in a multi-tone system is dependent on the greatest common divisor (GCD) of the tones. This known method however cannot be used to detect spur in a multi-band multi-mode non-periodic signal as the greatest GCD can be smaller than the resolution bandwidth (RBW). Further, no known method addresses how to reduce time spent on spur search measurement.

Using conventional method of linear scan for spur will not help to simulate or measure all bands or all modes of operation for each transmitter. Thus there will be a huge uncovered area in characterization for a designed RF-ASIC which adds a huge risk. Also to increase the coverage the measurement/ simulation time of the TRx Design will be huge and the design cycle will longer and economical not viable.

In order to speed up the design cycle of RF-ASIC thus there is a need for an improved method for spur frequency prediction, detection and elimination. Further, there is a need of an improved method in the case that the spur finding process needs to be implemented by a Built-In-Self Test (BIST) for performance enhancement of the mobile communication.

SUMMARY

An object of embodiments herein is to provide an improved method for spur search.

This object is achieved by a matrix for use with a radio transceiver having at least two signal sources. The matrix comprises for each selected set of two or more signal sources, a list of combinations of harmonics of the signal sources. The combinations of harmonics each have predicted amplitude greater than a predetermined threshold, and a frequency within a defined range related to a frequency range of one of the signal sources.

In another aspect, a method for creating a matrix is provided. The method comprises generating a spectrum of predicted harmonics for each of the at least two signal sources, limiting the number of harmonics in each spectrum based on properties of the signal sources and the transceiver and generating a matrix of all possible combinations of the limited number of harmonics of the at least two signal sources. Further, for each combination, the method comprises determining a predicted amplitude of the combination, removing all combinations which have a predicted amplitude below the predetermined threshold and/or outside the defined frequency range and saving the matrix.

In yet another aspect, a method for use with a radio transceiver having at least two signal sources is provided. The method comprises defining test frequencies for the signal sources and generating a matrix by generating a spectrum of predicted harmonics for each of the at least two signal sources, limiting the number of harmonics in each spectrum based on properties of the signal sources and the transceiver, generating a matrix of all possible combinations of the limited number of harmonics of the at least two signal sources; and, for each combination, determining a predicted amplitude of the combination, removing all combinations which have a predicted amplitude below the predetermined threshold and/or outside the defined frequency range and saving the matrix. The method further comprises identifying the predicted frequencies for combinations in the matrix with the largest amplitudes, generating simultaneous test signals at the defined test frequencies with the radio transceiver, acquiring a spectrum of frequencies generated from the test signals, analyzing the spectrum and identifying the frequencies of observed spurs in the spectrum, comparing the frequencies of the observed spurs with the predicted frequencies, and, if the correlation is satisfactory, accepting the matrix for use with the transceiver. If the correlation is not satisfactory, modifying the predetermined threshold and generating a new matrix according to the steps above.

In methods described herein, the properties may comprise a high frequency range.

In other methods herein, the properties may comprise a low frequency range.

In still other embodiments, the properties comprise a low frequency range.

Further, a method of avoiding spurs in a transceiver is provided. The method comprises identifying desired use frequencies for the at least two signal sources and using a matrix to identify potential harmonic combinations with amplitudes above the predetermined threshold. If such combinations are identified and characterized as representing potentially undesirable spurs, the risk of spurs is reduced by changing the frequency and/or amplitude of one or more of the at least two signal sources.

In other methods described herein, the step of identifying further comprises identifying power amplitudes.

BRIEF DESCRIPTION OF THE DRAWINGS

Examples of embodiments herein are described in more detail with reference to attached drawings in which:

FIG. 11 is a table describing methods disclosed herein.

DETAILED DESCRIPTION

Embodiments herein will be exemplified in the following detailed non-limiting description.

An exemplified method for identifying and predicting spur frequencies of multi-tone transceivers in multi-standard radio comprises measuring spur responses to find spur frequencies. In order to predict spur frequencies and determining sources of spur responses, simulating tones of the transceiver based on the measured and simulated spur frequencies may be performed.

Figure 1:
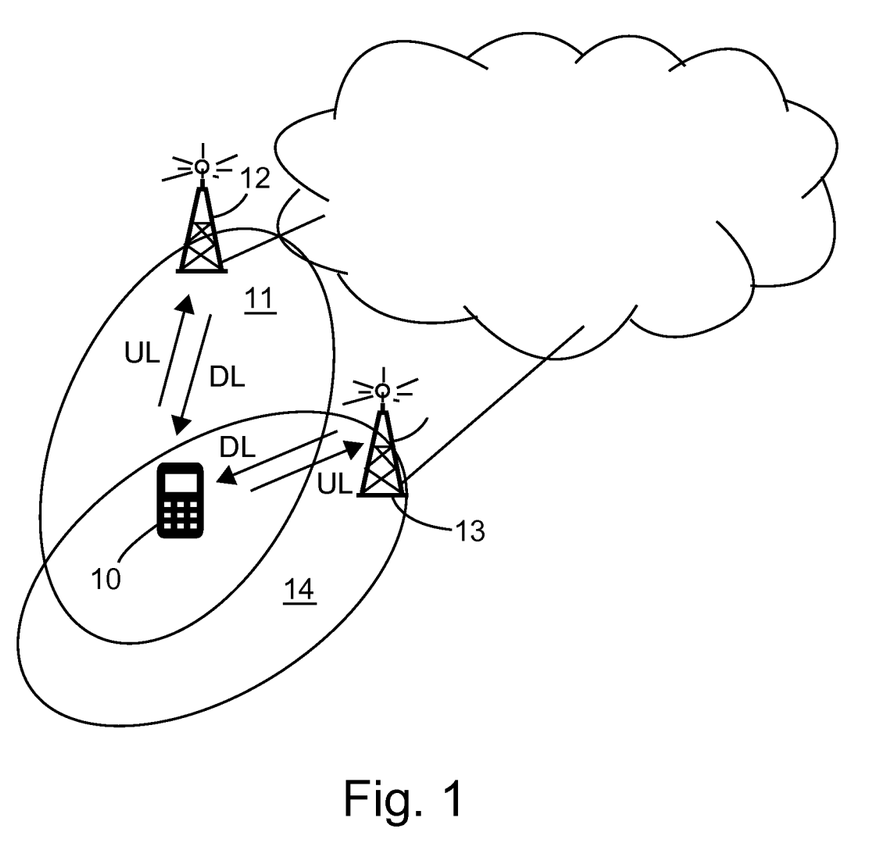
FIG. 1 is a schematic view of an example of a telecommunication system.

FIG. 1 shows an example of a telecommunications system 1 where spurious emissions occur. In the system 1, a user equipment 10, such as a mobile phone or a wireless terminal, communicates via a Radio Access Network (RAN) to one or more core networks (CN). A user equipment may be any wireless terminal, Machine Type Communication (MTC) device or node e.g. Personal Digital Assistant (PDA), laptop, mobile, sensor, relay, mobile tablet or even a small base station communicating within respective cell. The telecommunications system 1 covers a geographical area which is divided into cell areas, e.g. a first cell 11, being served by a radio base station 12. Another, a different, or second, radio base station 13 is also comprised in the system 1. The second radio base station 13 provides radio coverage over a second cell 14.

Figure 2:
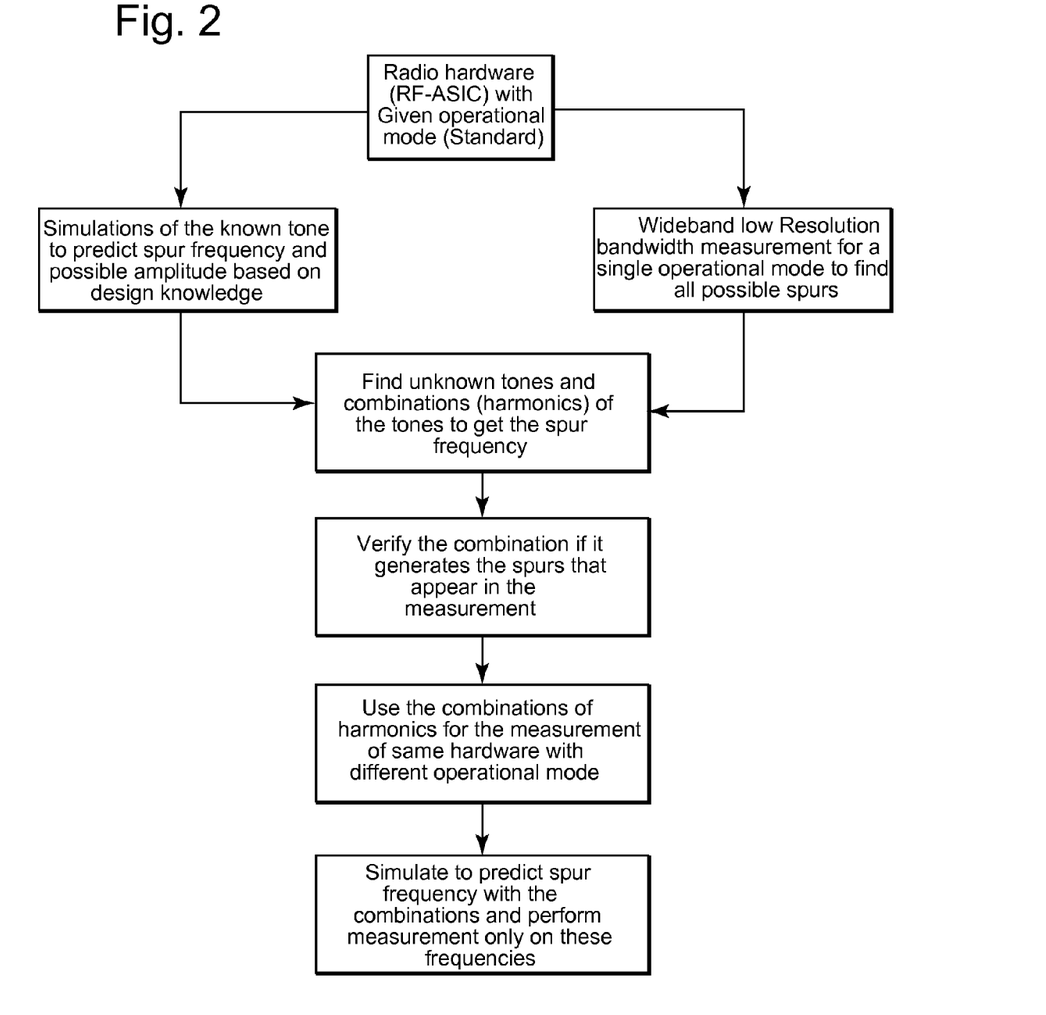
FIG. 2 is a flow chart for an exemplified method disclosed herein.

In FIG. 2, a flow chart of a proposed method is shown. The method is performed in Radio hardware (RF-ASIC) with given operational mode (Standard). Unknown sources for spurs are predicted from small measurement and simulation with known sources, preferably at maximum strength. Simulations of the known tones are performed in order to predict spur frequency and possible amplitude based on design knowledge. Wideband low Resolution bandwidth measurement is performed for a single mode to find all possible spurs. Unknown tones and combinations (harmonics) of the tones are found to get the spur frequency. The combination is verified if it generates the spurs that appear in the measurement. The combination of harmonics is used for the measurement of same hardware with different operational mode. Simulation is performed to predict spur frequency with the combination and perform measurement only on these frequencies. Thereafter, all sources are used to generate all possible spur frequency lists. By weighting the possible signal strength and harmonics the amplitude of spurs are extracted. Finally a measurement for a single operational mode of RF-ASIC is performed and the simulations possible spur positions for other operational modes are extracted.

The method may be performed by mobile electronic device comprising a multi-tone transceiver with a measuring unit determining spur responses to find spur frequencies, a simulation unit simulating tones of the transceiver to predict spur frequencies and a processing circuit configured to determining sources of spur responses based on the measured and simulated spur frequencies. The mobile electronic device may be represented by e.g. a wireless communication terminal, a mobile cellular phone, a Personal Digital Assistant (PDA), a wireless platform, a mobile station, a portable communication device, a laptop, a computer, a computer tablet, a wireless terminal acting as a relay, a relay node, a mobile relay, a Customer Premises Equipment (CPE), a Fixed Wireless Access (FWA) nodes or any other kind of device configured to communicate wirelessly.

A matrix for use with a radio transceiver with two signal sources is provided. The matrix comprises for each selected set of two or more signal sources, a list of combinations of harmonics of the signal sources. The combinations of harmonics each have a predicted amplitude greater than a predetermined threshold, and a frequency within a defined range related to a frequency range of one of the signal sources. The matrix is created by generating a spectrum of predicted harmonics for each of the at least two signal sources, preferably at their maximum strength, limiting the number of harmonics in each spectrum based on properties of the signal sources and the transceiver, generating a matrix of all possible combinations of the limited number of harmonics of the at least two signal sources and, for each combination, determining a predicted amplitude of the combination. All combinations which have a predicted amplitude below the predetermined threshold and/or outside the defined frequency range are removed and the matrix is saved.

Methods exemplified herein comprises measuring spur responses in frequency bands in the vicinity of spur frequencies determined for a given operational mode. A plurality of vectors is created comprising harmonics for single tones of the multi-tone transceiver. Thereafter, a combination matrix is created by linear addition of the harmonic vectors. The combination matrix is used to determine the sources of the spur response for a single operational mode based on the spur response for a single operational mode. Filtering of the combination matrix for low amplitude spurs is performed and such low amplitude spurs are disregarded, whereby the size of the combination matrix is reduced. Resolution bandwidth and frequency band in the vicinity of the determined spur frequencies/responses for characterizing the spur responses is determined. A multi-tone transceiver for multi-standard radio is provided comprising a wideband local oscillator with tunable frequency and a narrow-band filtering unit to filter after down-conversion. The measurement unit may further include a low pass and a high pass filter. The measurement unit may further include a band pass filter.

In proposed adaptive spur search methods disclosed herein, a mixture of simulation and measurement is used in order to minimize the total test time and predict possible spur frequencies early in the design cycle. Thus measurement for other modes will be performed only one the extracted frequency with moderate RBW. Therefore tedious low RBW wideband spur search will not be required.

Simulation of spurs is based on a method with matrix generation for a harmonic combination. Additionally, a method for finding a source of spurs and spur amplitude prediction are the steps that are very much needed to minimize number of effective spur and thus shorter simulation and test time. The RF/microwave characteristics of a transmitter may be used to predict operational modes, which may be used as basis for methods for spur identification and elimination disclosed herein.

Figure 3A:
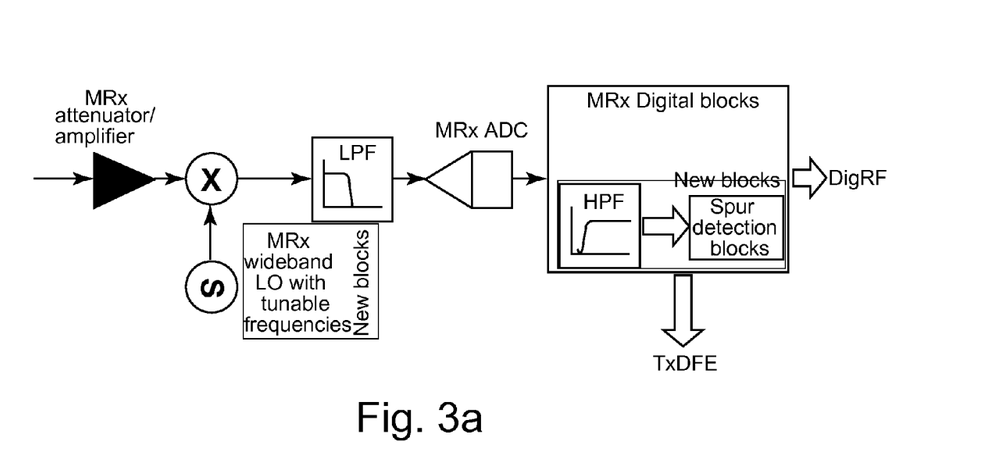
FIGS. 3a and 3b show a modification in MRx blocks to adopt BIST for spur search and others.
Figure 3B:
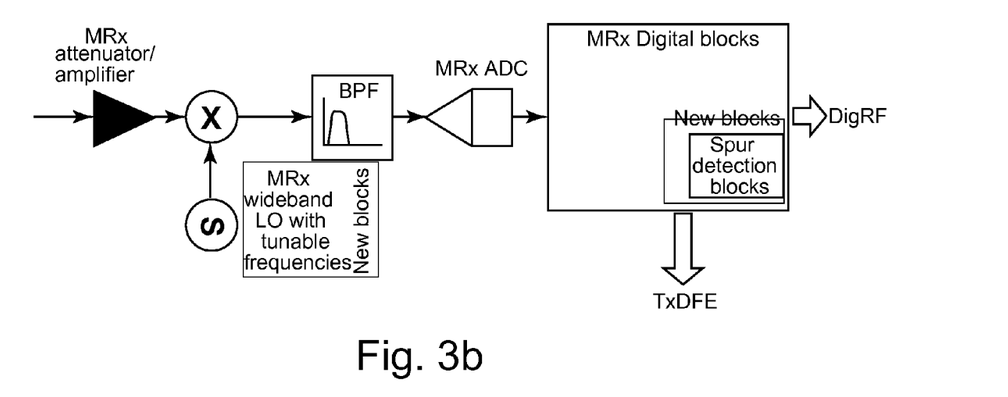

Turning to FIGS. 3(a) and (b); by using the Measurement Receiver (MRx) with narrow band low-pass filter (LPF) (2(a)) or band-pass filter (BPF) (2(b)), locations of the spurs will be found for a given set of operating frequencies of the TRx and the corresponding clocks and LOs. Image frequencies in the detected spurs will be eliminated as the LO for the MRx will be swept. The TRx can estimate the spur location, however, some processing and thus increment of power consumption is thus required. Methods proposed herein may as well be used in a base-station for mobile devices. However, in any case input to the method may come from mobile devices, for instance mobile phones. The information of spur frequency for a given setup of operational frequencies of the TRx will be fed to a base-station in order to estimate possible spur location for another set of operating frequencies using methods proposed herein. Estimated spur frequencies information may be used by the base station for adaptive frequencies allocation and other telecommunication standard related requirement fulfilment.

Figure 4:
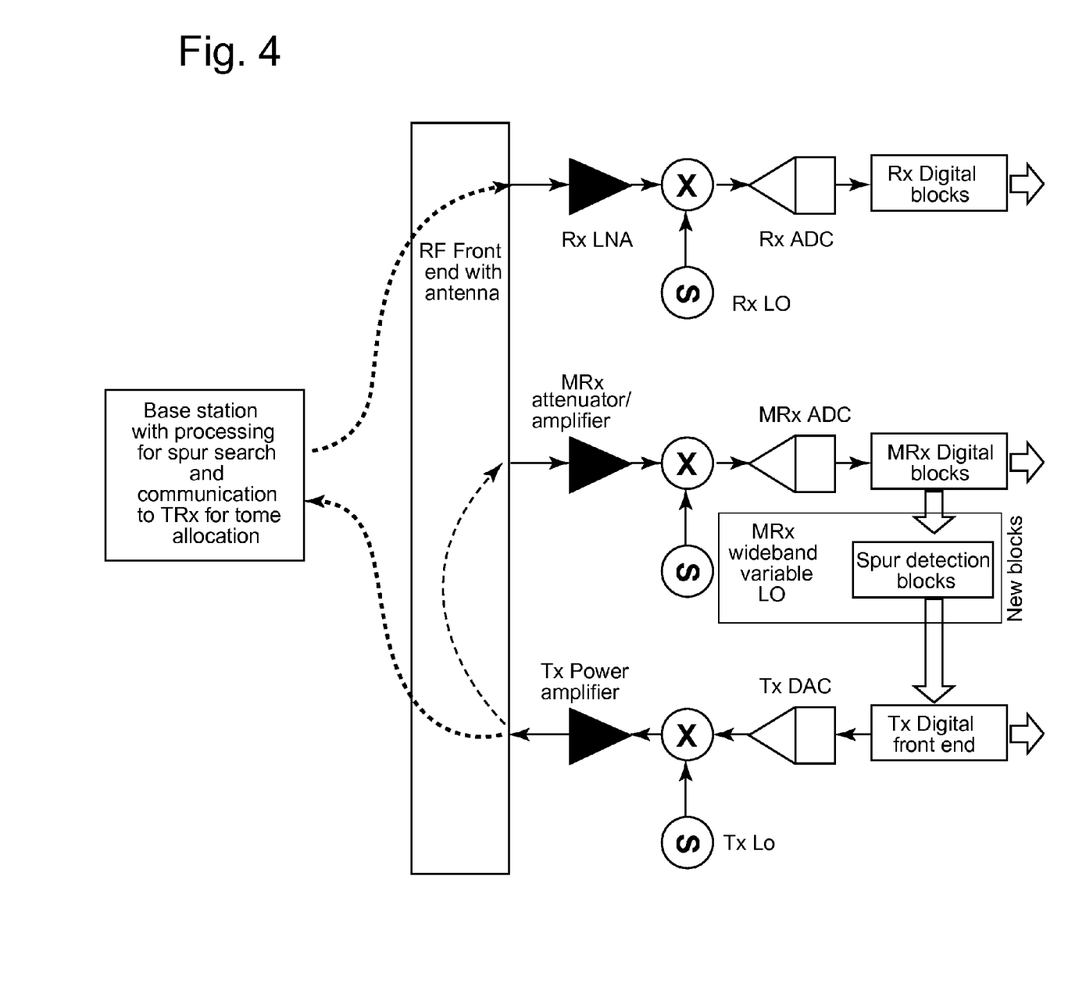
FIG. 4 shows implementation of a spur search proposed herein.

A possible scheme of using methods proposed herein for BIST, Built In Self Test, of a TRx, transceivers, with a modified MRx, measurement receiver, is presented in FIG. 4. As seen, a base-station with processing for spur search and communication with the TRx for tone allocation is present. Further units are RF (radio frequency) front end with antenna, Rx (receiver) LNA, Rx ADC, Rx Digital Blocks, Rx LO (local oscillator), MRx (measurement receiver) attenuator/amplifier MRx ADC, MRx Digital blocks, MRx wideband reliable LO, Spur detection blocks, Tx (transmitter) power amplifier, Tx DAC (digital-to-analog converter) Tx digital front end, Tx LO.

Figure 5:
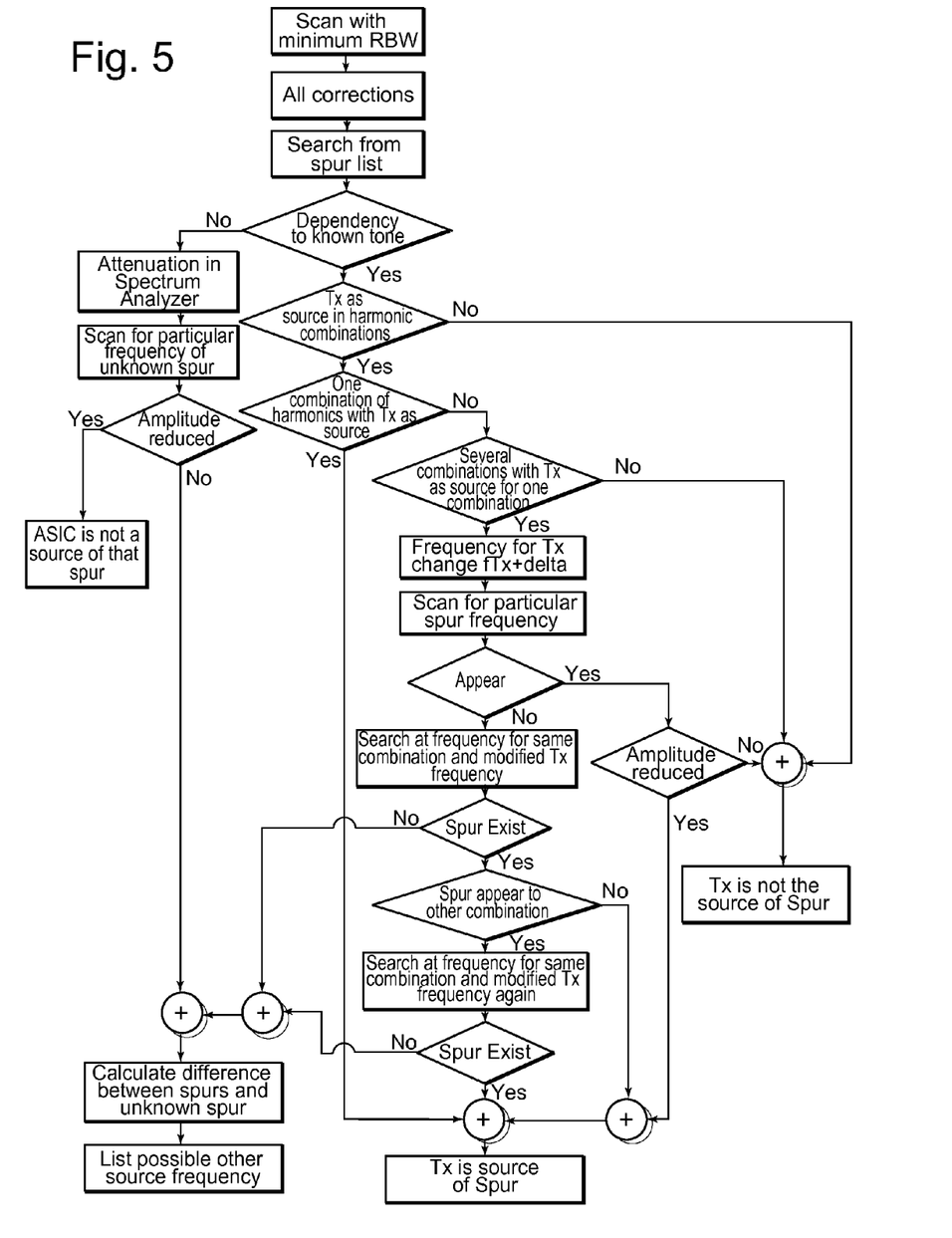
FIG. 5 is a flow chart for single measurement.
Figure 6:
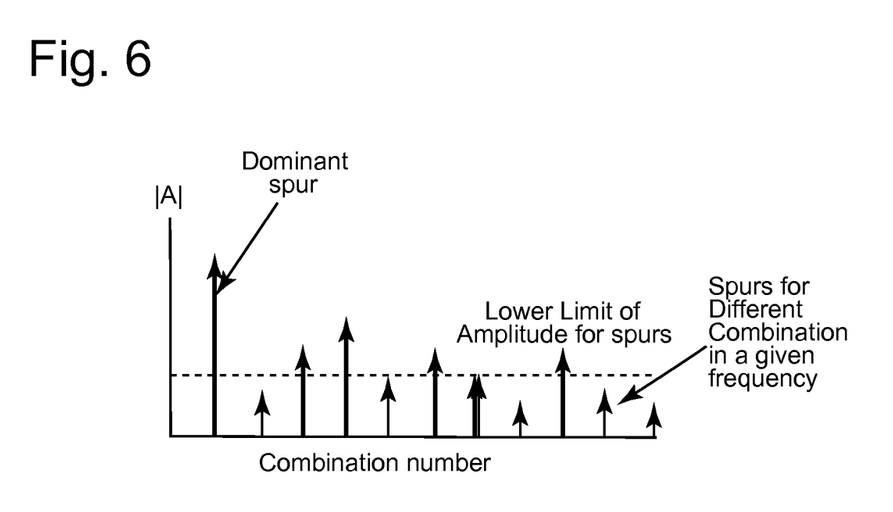
FIG. 6 shows spurs for different combination in a given frequency.
Figure 7:
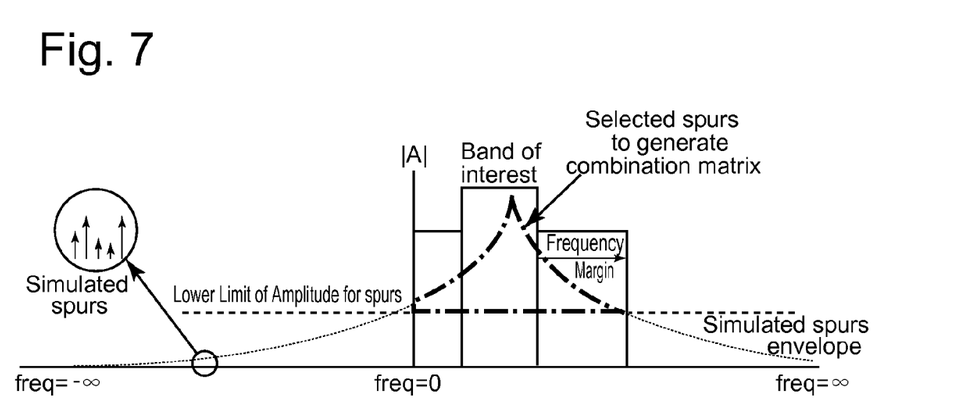
FIG. 7 shows selection of spurs.

FIG. 5 shows a flow chart for a given operational mode of a complete spur search method. The flow chart indicates measurement; however, the same flow may be used for design-simulation of transmitter block. Spur measurement post processing is started. Power vs. frequency data is measured. Measured data are read and correction for resolution bandwidth, correction for pixel resolution and correction for error vs. spur is performed. First a very wideband, low RBW simulation/measurement is done to identify frequencies of spurs within the band. All the needed and known steps for corrections are performed on the simulated/measured results. The thus corrected simulated/measured result for one operational mode contains the key of spurs for other operational mode. In a possible next step simulation may be performed in order to generate all possible spurs from the known tones of the Tx. Each spurs of a system is a function of all available tones in the. By using equation (2) the vector for spur $[f_{sj}]$ can be related to the tones $[f_i]$. The elements of a combination matrix, $a_{isj}$ is variable for each tone. The value may be any integer number in between ±∞ including 0. Spur frequency detection from measured result P(f)−P(noise floor)>(Limit) is compared with a spur detection limit. Tx signal is set to single tone. All other possible sources of tone and corresponding number of harmonics are checked. An array of possible tone dependent spurs and corresponding index within the measured band is generated. If one of the tones is integer multiplication to other, ignore that tone. A limit vector (mask) for different standard is generated.

Figure 12:
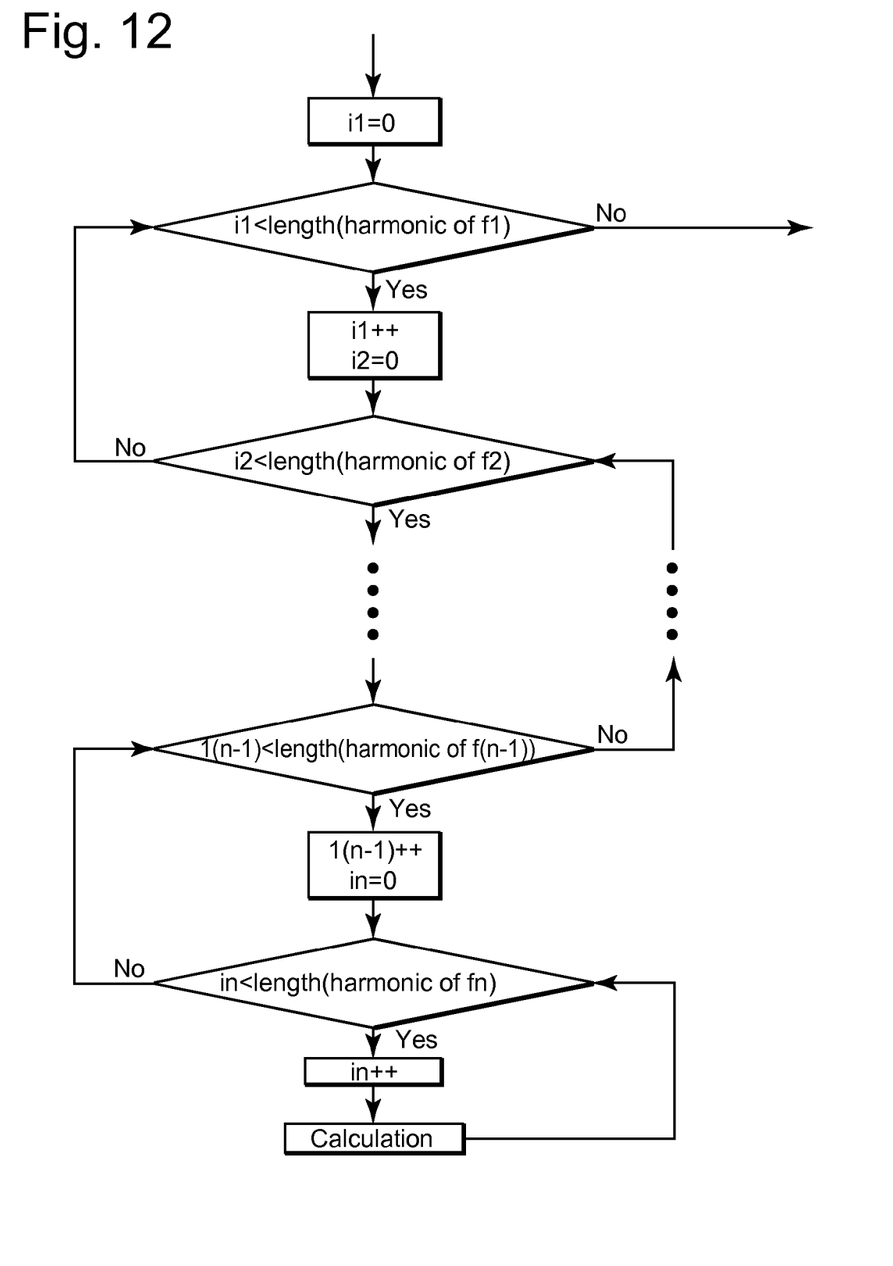
FIG. 12 is a flow chart for methods disclosed herein.

For a multi-tone system the size of a combination matrix may possibly be very large and thus an efficient method to construct the matrix is desirable. The combination matrix may be created using loops, e.g. "for-loop", please see FIG. 12.

However, if the number of tones is different for different test cases and not fixed difficulties may arise. It is further desired to decrease the number of total loops and corresponding simulation time and variable size. By creating a combination matrix by linear addition of harmonic vectors for each tone, the total number of loops will be reduced drastically, please see FIG. 11. After creating the combination matrix several filters for low amplitude spurs may be used in order to reduce the matrix size. The harmonics vectors are useful in that they define the combination matrix and thus both the simulation time problem and the memory size problem are solved. Further, the same combination matrix may be used for the same Tx with different operational mode.

Figure 8:
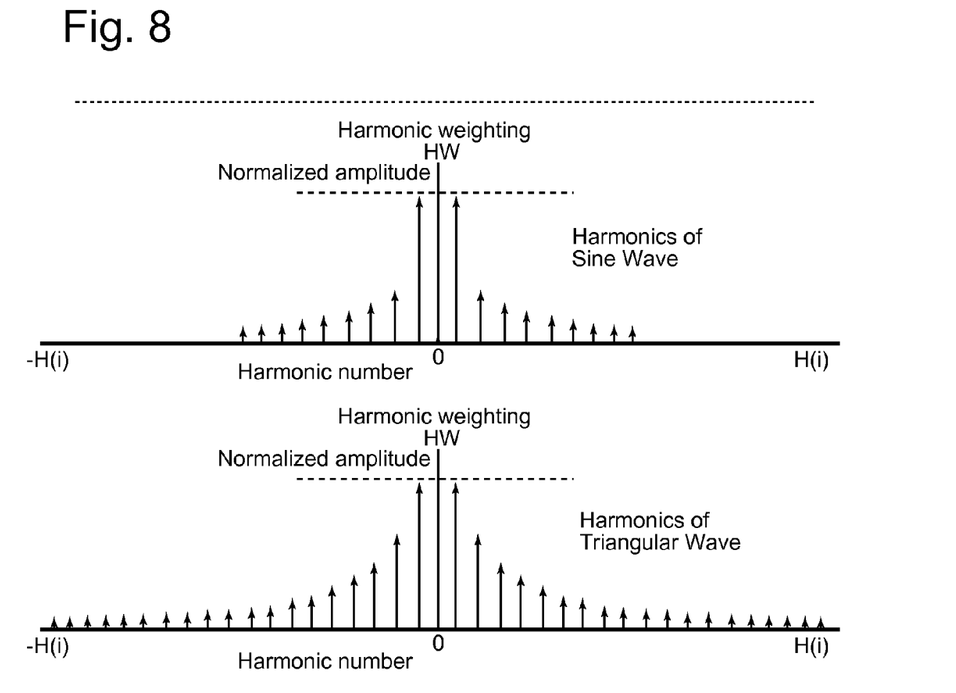
FIGS. 8 and 9 show harmonic weighting.
Figure 9:
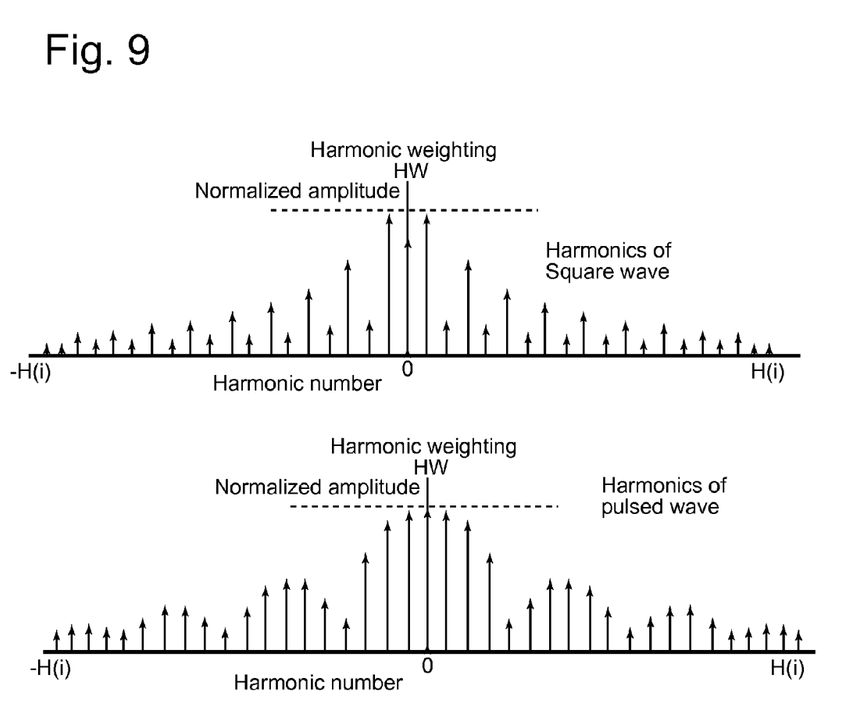

With reference to FIG. 8, in methods disclosed herein it is proposed to weight each of the harmonics and corresponding amplitude of each tone. The amplitude of the harmonics is depending on the type of signal used, such as sine or rectangular wave as shown in the figure. All tones are considered to be equal in strength of 0 dBc and the harmonics (HW) are treated for the worst possible scenario where all higher harmonics show an elevated level of energy. The amplitude of the spurs may then be estimated using equation (3). j=tone number, i=harmonic number of the tone j in the combination, k=combination number, I=spur number and H is the transfer function of the tone to the Tx.

The transfer function (K) of each tone is then considered as the maximum possible coupling to the signal of interest. The LO of a transmitter, K is set to 1 as a reference. The reason to take worst possible scenario is that, in the measurement, the amplitude of the spurs cannot be achieved accurately enough due to noise, non-linearity and bandwidth limitations. By using a worst case possible scenario, the simulated spurs amplitude will always be greater than the measured amplitudes. Thus, the risk to miss any critical measuring point is eliminated. The size of the combination matrix may thereafter be reduced by calculating the amplitude and filtering out combinations giving a lower amplitude than a given amplitude limit, e.g. −150 dBc.

A search is performed in order to find spurs that are dependent to the known tones. Using the GCD of the differences of the spurs unknown tones are predicted which may cause unexpected spurs in the simulation or measurement. By known tones a final combination matrix, indicating spurs above a desired level are created. It can be seen that the combination matrix and corresponding amplitude of spurs are independent in relation to the tones. This independence of amplitude and combination matrix from the tones may form the basis for methods proposed herein.

When the Tx will be used for a new operating mode with different tones, the same combination will be used in simulation in order to predict the possible spurs. The prediction process for spur frequencies is a multiplication of a combination matrix and the vector for the tones as equation (2), providing that the number of tones is constant. For a given Tx the number of the possible tones to calculate the spurs for that operating mode is fixed.

This calculated spurs from a combination matrix may be used in the design-phase of the ASIC. By trying to change input tones position or amplitude of the undesired spurs will be controlled. In the measurement only the selected frequency points will be measured. Thus tedious scanning process of spurs with lowest possible RBW may be minimized. At the end by simulation and measurement spurs can be detected with maximum coverage and spurious emission problem can be minimized in the design run of the ASIC.

Coverage of methods proposed herein depends on BW for simulation to generate a combination matrix. If the simulation is done for a narrow band the coverage will be reduced with lost spurs even in the bandwidth of interest. A simulation starting from 0 Hz up to the frequency larger than the maximum frequency of interest will provide the maximum coverage of ~100%.

Methods proposed herein are useful in RF ASIC design and application phase. The method may be implemented in the following cases Design phase of RF ASIC: Using in the design and commercially available simulation environment. By doing so spurs can be estimated faster in the design phase of TRx. Measurement phase: Using MATLAB programming based function in Test environment to detect and simulate the spurs as proposed. In that way spurs in TRX can be detected faster Application phase: Using the measurement receiver (MRx) with variable LO (MRx) to detect all spurs in the desired band and use the method to estimate all spurs and compensate in the Digital Front End of Transmitter (TxDFE). Thus spurious emission of the TRx will then be controlled with some processing in baseband. In the application of MRx, narrow-band filtering after down-conversion with tunable LO is the key. The DC component after the down-conversion represent the LO of MRx. This signal may appear dominant in comparison to spur and need to filter out. Either a narrow band analog band-pass filter after mixer or a digital high pass filter (HPF) after ADC will be used to exclude DC component. In digital domain, the power of the measured signal will be estimated for a certain time. By comparing the power over certain threshold for a given LO frequency, the spur frequencies will be calculated. By comparing the LO frequencies the image frequencies of spurs will be omitted. These measured spurs are for a given set of operating frequency of the TRx. Then using the presented method, spurs for other sets of operating frequencies will be calculated and used. More mobile device as the processing will require more power it will be done in Base-station. Then base-station will use that information of spurs for operating frequencies selection for TRx.

Instrumentation: Use as add-on blocks in the signal/spectrum analyzer such so the instrument can generate test pints to measure based on output of TX of the DUT and to reduce test time With methods proposed herein there will be at least 40% reduction of total time for simulation/measurement of spurious emission for a Tx with multiple mode of operation. Thus if a Tx is designed to operate for 12 combinations of operational mode, the total time reduction will be at least 80%. As the coverage and accuracy can be reached to ~100% total design-cycle of RF ASIC will be smaller with maximum test coverage when it comes to spurious emission.

One advantage is that the total simulation or measurement time drastically will be reduced. The accuracy of predicting spur frequency is based on initial run and can reach near 100%. The data is reusable for other tests and for the re-design phase of RF-ASIC. Faster design cycle of RF-ASIC for multistandard radio is achieved. The method is applicable in any transceiver design, verification and application process such as RF-ASIC, Radio Frequency Sub System (RFSS), transceiver (TRx), Radar etc. Built-in-Self test of spurious emission for TRx.

Figure 10:
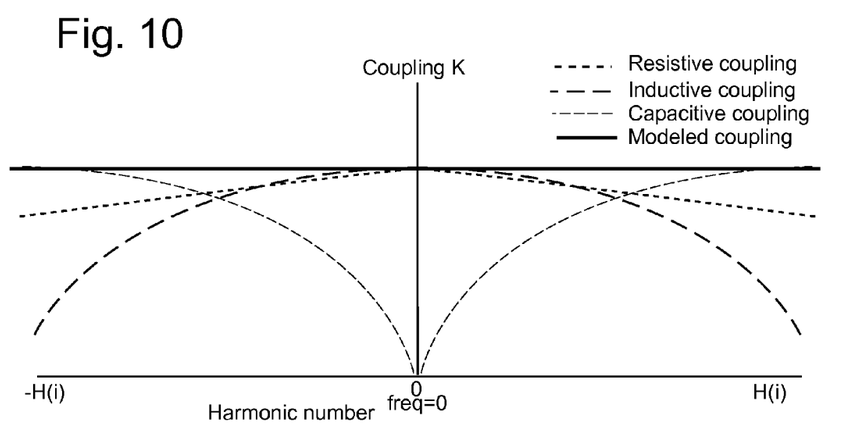
FIG. 10 shows different couplings.

FIG. 10 shows different couplings and FIG. 11 is a table describing methods disclosed herein.

The embodiments herein are not limited to the above described examples. Various alternatives, modifications and equivalents may be used. Therefore, this disclosure should not be limited to the specific form set forth herein. This disclosure is limited only by the appended claims and other embodiments than the mentioned above are equally possible within the scope of the claims.

ABBREVIATIONS

ASIC—Application specific Integrated Circuit
ADC—Analog-to-digital converter
BB—Baseband
BIST—Built-In-Self Test
BPF—band-pass filter
BW—bandwidth
DAC—digital-to-Analog converter
GCD—greatest common divisor
IC—Integrated circuit
LO—Local oscillator
LPF—low-pass filter
MRx—Measurement Receiver
RBW—resolution bandwidth
RF—radio Frequency
RFSS—Radio Frequency Sub System
Rx—Receiver
TRx—Transceiver
Tx—transmitter TxDFE—Digital front-end for Transmitter
VCO—Voltage controlled oscillator

The invention claimed is:

1. A method for use with a mobile electronic device comprising a radio transceiver having at least two signal sources, the method comprising:
   defining test frequencies for the at least two signal sources;
   generating a matrix by
      generating a spectrum of predicted harmonics for each of the at least two signal sources;
      limiting a number of harmonics in each spectrum based on properties of the at least two signal sources and the radio transceiver;
      generating the matrix using all possible combinations of the limited number of harmonics of the at least two signal sources; and,
      for each combination;
         determining a predicted amplitude of the combination;
         removing all combinations which have a predicted amplitude below a predetermined threshold and/or outside a defined frequency range;
      saving the matrix,
   identifying predicted frequencies for combinations in the matrix with the largest amplitudes;
   generating and transmitting, by the radio transceiver, simultaneous test signals at the defined test frequencies with the radio transceiver;
   receiving and acquiring, by a receiver in the mobile electronic device, a spectrum of frequencies generated from the test signals;
   analyzing the spectrum of frequencies generated from the test signals and identifying the frequencies of observed spurs in the spectrum of frequencies generated from the test signals;
   comparing the frequencies of the observed spurs with the predicted frequencies;
   accepting the matrix for use with the radio transceiver if the correlation is satisfactory;
   modifying the predetermined threshold and generating a new matrix if the correlation is not satisfactory; and
   transmitting, by the radio transceiver, over an operating frequency, wherein the operating frequency is selected using the accepted matrix or new matrix.

2. A method according to claim 1, wherein said properties comprises a high frequency range.

3. A method according to claim 1, wherein said properties comprises a low frequency range.

4. A method of avoiding spurs in a transceiver having at least two signal sources, the method comprising:
   identifying desired use frequencies for the at least two signal sources;
   generating a matrix by
      generating a spectrum of predicted harmonics for each of the at least two signal sources;
      limiting a number of harmonics in each spectrum based on properties of the signal sources and the transceiver;
      generating the matrix using all possible combinations of the limited number of harmonics of the at least two signal sources; and,
      for each combination;
         determining a predicted amplitude of the combination;
         removing all combinations which have a predicted amplitude below the predetermined threshold and/or outside the defined frequency range;
      saving the matrix,
   using the matrix to identify potential harmonic combinations with amplitudes above a predetermined threshold, wherein the matrix comprises for the at least two signal sources, a list of combinations of harmonics of the signal sources, the combinations of harmonics each having a predicted amplitude greater than the predetermined threshold, and a frequency within a defined range related to a frequency range of one of the signal sources; and
   if the identified potential harmonic combinations are characterized as representing potentially undesirable spurs, then reducing the risk of spurs by changing the frequency and/or amplitude of one or more of the at least two signal sources; and
   transmitting, by the one or both of the at least two signal sources, using the changed frequency and/or amplitude.

5. A method according to claim 4, wherein the step of identifying further comprises:
   identifying power amplitudes.

* * * * *